US010637373B2

(12) United States Patent
Kawazu et al.

(10) Patent No.: US 10,637,373 B2
(45) Date of Patent: Apr. 28, 2020

(54) CONTROL APPARATUS FOR ROTARY ELECTRIC MACHINE

(71) Applicant: DENSO CORPORATION, Kariya, Aichi-pref. (JP)

(72) Inventors: Shinsuke Kawazu, Kariya (JP); Akira Kato, Kariya (JP); Takashi Senda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/095,511

(22) PCT Filed: Apr. 20, 2017

(86) PCT No.: PCT/JP2017/015936
§ 371 (c)(1),
(2) Date: Oct. 22, 2018

(87) PCT Pub. No.: WO2017/183699
PCT Pub. Date: Oct. 26, 2017

(65) Prior Publication Data
US 2019/0131893 A1 May 2, 2019

(30) Foreign Application Priority Data

Apr. 21, 2016 (JP) ................................ 2016-085381

(51) Int. Cl.
*H02P 3/14* (2006.01)
*B60L 7/10* (2006.01)
(Continued)

(52) U.S. Cl.
CPC ................. *H02P 3/14* (2013.01); *B60L 7/10* (2013.01); *H02P 9/04* (2013.01); *H02P 29/62* (2016.02);
(Continued)

(58) Field of Classification Search
CPC .... H02P 3/14; B60L 7/10; B60Y 2300/18125; Y02T 10/642
See application file for complete search history.

(56) References Cited

U.S. PATENT DOCUMENTS

2008/0197796 A1* 8/2008 Bae ....................... B60L 15/025
318/432
2010/0194355 A1 8/2010 Wada et al.
(Continued)

FOREIGN PATENT DOCUMENTS

EP 3173281 A1 5/2017
JP 4849421 B2 1/2012
(Continued)

OTHER PUBLICATIONS

Jul. 18, 2017 International Search Report issued in International Patent Application PCT/JP2017/015936.

*Primary Examiner* — Cortez M Cook
(74) *Attorney, Agent, or Firm* — Oliff PLC

(57) ABSTRACT

A system includes a rotary electric machine, wiring, a battery that is connected to the rotary electric machine by the wiring harness, and an upper limit value setting section which sets an output upper limit value that is an upper limit of an output command of the rotary electric machine. A control apparatus which controls the rotary electric machine is provided with a temperature acquisition section which acquires the temperature of at least one of the battery and the wiring, an allowable output value calculation section which calculates an allowable output value that is an upper limit allowed for an output command of the rotary electric machine, based on the temperature that is acquired by the temperature acquisition section, and a transmitting section which transmits the allowable output value calculated by the allowable value calculation section to the upper limit value setting section.

14 Claims, 8 Drawing Sheets

(51) Int. Cl.
*H02P 9/04* (2006.01)
*H02P 29/62* (2016.01)

(52) U.S. Cl.
CPC ... *B60Y 2300/18125* (2013.01); *Y02T 10/642* (2013.01)

(56) References Cited

U.S. PATENT DOCUMENTS

| | | |
|---|---|---|
| 2012/0101683 A1 | 4/2012 | Nishimura |
| 2013/0271093 A1 | 10/2013 | Komurasaki et al. |
| 2013/0320747 A1 | 12/2013 | Ozaki |
| 2014/0118866 A1* | 5/2014 | Iwami .................. H02H 7/08 361/25 |
| 2017/0203670 A1* | 7/2017 | Morinaga ................ B60L 3/00 |

FOREIGN PATENT DOCUMENTS

| | | | |
|---|---|---|---|
| JP | 2012-100435 A | 5/2012 | |
| JP | 2013-99177 A | 5/2013 | |
| JP | 2013-187983 A | 9/2013 | |
| JP | 2013187983 A * | 9/2013 | ............ H02P 29/662 |

* cited by examiner

US 10,637,373 B2

CONTROL APPARATUS FOR ROTARY ELECTRIC MACHINE

CROSS-REFERENCE TO RELATED APPLICATIONS

This application is the U.S. national phase of International Application No. PCT/JP2017/015936 filed Apr. 20, 2017 which designated the U.S. and claims priority to Japanese Patent Application No. 2016-85381 filed Apr. 21, 2016, the contents of which are incorporated herein by reference.

TECHNICAL FIELD

The present disclosure relates to a control apparatus for controlling a rotary electric machine.

BACKGROUND ART

In the prior art, in the case of a rotary electric machine having a polyphase winding and field winding and for which an AC output current from the polyphase winding is rectified by a plurality of rectifier elements or switching elements, the energization interval of the field winding of the rotor is changed in each of respective fixed periods. The proportion of the energization interval is referred to as the duty value of the field winding, which is set variably in accordance with the amount of electric power, etc., required from the rotary electric machine.

A control apparatus for a rotary machine is described in PTL 1 for use in varying the duty value of the field winding. With the control apparatus described in PTL 1, changeover can be performed between short-time rated operation in which the duty value is large, and continuous rated operation in which the duty value is small. In addition, a temperature sensor is provided close to a power transistor that controls the energizing of the field winding If the temperature detected by the temperature sensor indicates an overheated condition, then short-time rated operation is inhibited.

CITATION LIST

Patent Literature

[PTL 1] Japanese Patent Publication No. 2013-219965

SUMMARY OF THE INVENTION

With the control apparatus described in PTL 1, when the temperature in the vicinity of the power transistor indicates an overheating condition, short-time rated operation is inhibited. However in controlling a rotary electric machine, there are parts other than the power transistor or the rotary electric machine for which problems of temperature increase may occur. If the temperature increase is suppressed by making these parts large in scale and increasing the capability of each part, then it becomes difficult to reduce the apparatus size or lower the costs. On the other hand if the output of the rotary electric machine is restricted, for preventing increase in temperature of these parts, then effectively, a limitation is placed upon controlling the rotary electric machine to produce a high output.

The present disclosure is intended to overcome the above problem, having a main objective of providing a control apparatus for a rotary machine which can enable the output from the rotary electric machine without excessive increase in rating respective parts of the apparatus.

The present disclosure provides the following means for overcoming the above problem.

A first means includes a control apparatus for controlling a rotary electric machine, with the control apparatus being applied to a system that includes the rotary electric machine, wiring, a battery that is connected to the rotary electric machine by the wiring, and an upper limit value setting section which sets an output upper limit value that is an upper limit of an output command for the rotary electric machine, and with the control apparatus comprising a temperature acquisition section which acquires the temperatures of at least two of the rotary electric machine, the battery and the wiring, an allowable output value calculation section which calculates, for each of the objects whose temperature is acquired, an allowable output value that is the upper limit allowed for an output command of the rotary electric machine, with the calculation being based on the temperatures acquired by the temperature acquisition section, and a transmitting section which transmits the allowable output values for the respective objects, calculated by the allowable value calculation section, to the upper limit value setting section.

With the above configuration, the rotary electric machine and the battery are connected by the wiring, and the upper limit value setting section sets an output upper limit value, which is an upper limit of an output command for the rotary electric machine.

The temperatures of at least two of the rotary electric machine, the battery and the wiring are acquired by the temperature acquisition means. The allowable value calculation section then calculates, for each of the objects whose temperature is acquired, an allowable output value that is an allowable upper limit of an output command for the rotary electric machine, with the calculation being based on the temperatures acquired by the temperature acquisition section. Hence, the allowable output value of the rotary electric machine can be calculated taking into consideration the temperatures of at least two of the rotary electric machine, the battery and the wiring. It should be noted that it would be equally possible to use the generated electric power, the drive electric power, the generated current, the drive current, the drive torque, the control torque, etc., as the allowable output value of the rotary electric machine. These allowable output values correspond to an allowable input value or to an allowable output value of the battery, and correspond to an allowable value of energization of the wiring.

These allowable output values calculated by the allowable value calculation section are then transmitted by the transmitting section to the upper limit value setting section. Hence the upper limit value setting section can set the output upper limit value for the rotary electric machine by using the allowable output values of at least two of the rotary electric machine, the battery and the wiring. That is to say, the output upper limit value for the rotary electric machine is set based on the allowable output values of at least two of the rotary electric machine, the battery and the wiring.

It thus becomes possible to set the allowable output value such as to increase the output from the rotary electric machine, while also preventing an excessive increase in temperature of the rotary electric machine, the battery or the wiring. As a result, the effective output from the rotary electric machine can be increased, without requiring an excessive capability for the rotary electric machine, the battery or the wiring. Furthermore an optimum allowable output value of the rotary electric machine can be set for the entire system, which takes into consideration the allowable output values of at least two of the rotary electric machine, the battery and the wiring. As a result, the output of the rotary electric machine can be effectively increased, while avoiding providing an excessive capability for the rotary electric machine, the battery or the wiring.

With a second means, the allowable value setting section calculates the allowable output value for the rotary electric machine based further upon a duration for which electrical power is inputted and outputted between the rotary electric machine and the battery.

The longer the duration for which electric power is inputted and outputted between the rotary electric machine and the battery, the higher will become the temperature of the battery and of the wiring. In that respect, with the above configuration, the allowable output value for the rotary electric machine is calculated based further upon the duration of inputting and outputting electric power between the rotary electric machine and the battery. Hence the allowable output value of the rotary electric machine can be more appropriately calculated.

With a third means, the control apparatus is provided with an upper limit value setting section, and the upper limit value setting section sets the lowest one of the allowable output values of the respective objects as the output upper limit value.

With the above configuration, the lowest one of the allowable output values of the respective objects is set as the output upper limit value by the upper limit value setting section. Hence, an excessive rise in temperature can be prevented, for all of the objects.

With a fourth means, the control apparatus is provided with an upper limit value setting section, and the upper limit value setting means sets, as the output upper limit value, the allowable output value of the one of the respective objects whose temperature, acquired by the temperature acquisition section, is closest to the temperature upper limit value.

With the above configuration, the allowable output value of the one of the respective objects whose temperature, acquired by the temperature acquisition section, is closest to the temperature upper limit value is set as the output upper limit value by the upper limit value setting section. Hence, an excessive rise in temperature can be prevented, even for the object whose temperature is closest to the temperature upper limit value.

With a fifth means, the control apparatus is provided with an upper limit value setting section, and a temperature prediction section which predicts future values of temperature that will be acquired by the temperature acquisition section for the respective objects, and the upper limit value setting section calculates an integrated value of electric power inputted and outputted between the rotary electric machine and the battery in a prescribed duration, based on the respective allowable output values of the objects and on the respective predicted values of future temperature that are predicted by the temperature prediction section, and sets the output upper limit value such as to be higher than the integrated value.

With the above configuration, future values of temperature that will be acquired by the temperature acquisition section for each of respective objects are predicted by the temperature prediction section. The integrated value of electric power inputted and outputted between the rotary electric machine and the battery in a prescribed duration is then calculated, based on the allowable output values of the respective objects and on the future temperature values of the respective objects, and the allowable output values are set such as to maximize the integrated value. Hence when electrical power is inputted and outputted between the rotary electric machine and the battery for a prescribed duration, energy can be utilized to the maximum.

With a sixth means, the control apparatus is provided with an upper limit value setting section and with a temperature prediction section that predicts future values of temperature that will be acquired by the temperature acquisition section for each of respective objects. The upper limit value setting section calculates the efficiency of inputting and outputting electric power between the rotary electric machine and the battery for a prescribed duration, based on the allowable output values of the respective objects and on the future temperature values that are predicted for the respective objects by the temperature prediction section, and sets the output upper limit value such as to maximize the efficiency.

The efficiency of inputting and outputting electric power between the rotary electric machine and the battery varies in accordance with the conditions of the rotary electric machine and the battery. When regeneration or driving is being continued by the rotary electric machine, energy can be more effectively utilized by maximizing the efficiency after a prescribed time than by temporarily maximizing the output. In that respect, with the above configuration, future values of the temperatures that will be acquired for the respective objects by the temperature acquisition section are predicted by the temperature prediction section. Based on the allowable output values of the respective objects and on the future temperature values that are predicted for the respective objects, the efficiency of inputting and outputting electric power between the rotary electric machine and the battery for a prescribed duration is calculated, and the allowable output values are set such as to maximize the efficiency. Hence, not only can the effective output of the rotary electric machine be increased, but also energy can be more effectively utilized.

With a seventh means, the temperature acquisition section acquires the temperature of the battery, and when the battery temperature as acquired by the temperature acquisition section is lower than a prescribed temperature, the upper limit value setting section calculates, as the efficiency, the efficiency of inputting and outputting to/from the battery after a prescribed time, and sets the allowable output values such as to maximize the efficiency of inputting and outputting to/from the battery.

If the battery temperature is lower than a prescribed temperature, there is a danger that sufficient capability may not be obtained for the battery. In that respect, with the above configuration when the battery is lower than a prescribed temperature, the efficiency of inputting and outputting to/from the battery after a prescribed time is calculated, and the allowable output values are set such as to maximize the efficiency of inputting and outputting to/from the battery. Hence, the capability of the battery after a prescribed time can be secured to the maximum extent.

With an eighth means, the control apparatus is provided with the upper limit value setting section, and a temperature prediction section which predicts future values of the temperatures that will be acquired for each of the objects by the temperature acquisition section, and the upper limit value setting section, based on the output upper limit values of the respective objects and on the future values of temperature predicted by the temperature prediction section for the respective objects, sets the output upper limit values such that the respective future values predicted for each of the objects will become lower than respective target temperatures of the objects, when inputting and outputting of electric power between the rotary electric machine and the battery occurs for a prescribed duration.

With the above configuration, when electric power is inputted and outputted between the rotary electric machine and the battery for a prescribed duration, the upper limit value setting section sets the output upper limit values such that the respective future values predicted for each of the objects will become lower than respective target temperatures of the objects, with the output upper limit values being set based on the output upper limit values of the respective objects and on future values of temperature of the respective objects. Hence, when the temperatures of each of the objects are to be held below respective target temperatures of the objects, the allowable output values can be calculated such as to achieve that result.

With a ninth means, the control apparatus is provided with a duration prediction section which predicts a duration of inputting and outputting of electric power between the rotary electric machine and the battery, and with the upper limit value setting section, and when the duration that is predicted by the duration prediction section is shorter than a threshold value, the upper limit value setting section sets the output upper limit values by giving priority to a high output from the rotary electric machine, while when the duration is longer than the threshold value, the upper limit value setting section sets the output upper limit values by giving priority to efficiency of output of the rotary electric machine.

If the duration of inputting and outputting electric power between the rem and the battery is short, then since increases in temperature of the respective sections will be small, it is effective to make the output from the rotary electric machine become high. On the other hand when the duration of inputting and outputting electric power between the rem and the battery is long, it is more effective to perform inputting and outputting electric power between the rem and the battery in a condition in which the output efficiency of the rotary electric machine is high, over the long duration. In that respect, with the above configuration, if the predicted duration is shorter than a threshold value, the upper limit value setting section sets the output upper limit values such as to give priority to a high output from the rotary electric machine, while if the duration is longer than the threshold value, the upper limit value setting section sets the output upper limit values such as to give priority to achieving output efficiency for the rotary electric machine. Hence, the output upper limit value of the rotary electric machine can be appropriately set, in accordance with the efficiency of inputting and outputting electric power between the rem and the battery.

With a tenth means, the control apparatus is provided with the upper limit value setting section and with a cooling input section that inputs the condition of cooling control which cools at least one of the rotary electric machine, the battery and the wiring, and the allowable output value setting section sets the output upper limit values based further on the condition of the cooling apparatus, inputted by the cooling input section.

With the above configuration, the cooling input section inputs the condition of cooling control which cools at least one of the rotary electric machine, the battery and the wiring. The allowable output value setting section sets the output upper limit value of the rotary electric machine based further upon the condition of the cooling control, inputted by the cooling input section. Hence, the output upper limit value of the rotary electric machine can be appropriately set, taking into consideration the condition of the cooling control, and consequently the effective output of the rotary electric machine can be increased.

With an eleventh means, the system is provided with a cooling control section which performs cooling control, that cools at least one of the rotary electric machine, the battery and the wiring, and if the upper limit value setting section sets an output upper limit value that exceeds the allowable output values of each of the objects, the upper limit value setting section transmits a command for increasing the output of the cooling control to the cooling control section.

With the above configuration, if the upper limit value setting section sets an output upper limit value that exceeds the allowable output values of each of the objects, the upper limit value setting section transmits a command to a cooling control section for increasing the output of the cooling control. Hence, when there is a danger of excessive increase in the temperature of any section, the temperature increase can be suppressed by raising the output of the cooling control.

With a twelfth means, the control apparatus is provided with a braking input section that inputs braking requests, from a braking system of the vehicle, for causing braking torque to be generated by the rotary electric machine, and is provided with the upper limit value setting section, and if a braking request is inputted by the braking input section, the upper limit value setting section forcibly sets the output upper limit value to a braking-use output upper limit value.

With the above configuration, the braking input section inputs braking commands, from a braking system of the vehicle, for causing braking torque to be generated by the rotary electric machine. When the braking input section inputs a braking command, the output upper limit value of the rotary electric machine is forcibly set to a braking-use output upper limit value. Hence, if it becomes necessary for braking torque to be generated by the rotary electric machine, for the safety of the vehicle, the output upper limit value of the rotary electric machine can be set with priority given to that necessity.

With a twelfth means, the control apparatus is provided with a braking input section that inputs braking requests, from a braking system of the vehicle, for causing braking torque to be generated by the rotary electric machine, and is provided with the upper limit value setting section, and the output upper limit value setting section calculates a short-period use output upper limit value and a long-period use output upper limit value as the output upper limit value, and forcibly sets the short-period use output upper limit value as the output upper limit value when the braking input section inputs a braking command.

With the above configuration, a short-period use output upper limit value and a long-period use output upper limit value are calculated as the output upper limit value of the rotary electric machine by the output upper limit value setting section. When outputting by the rotary electric machine is performed only for a short period, temperature increase of the sections will be small, so that the short-period use output upper limit value can be made higher than the long-period use output upper limit value. Furthermore, a period in which braking requests from the braking system are inputted will be a comparatively short period, that continues until the vehicle speed becomes reduced. Hence, when the braking input section inputs a braking request, the short-period use output upper limit value is forcibly set as the output upper limit value. Hence, if it becomes necessary for braking torque to be generated by the rotary electric machine, for the safety of the vehicle, the output upper limit value of the rotary electric machine can be set with priority given to that necessity.

With a fourteenth means, the allowable value calculation section and the transmitting section are provided with a rotary electric machine control section that controls the rotary electric machine or with a battery control section that controls the battery.

With the above configuration, each of the functions of the above-described allowable value calculation section and transmitting section can be implemented by a rotary electric machine control section that controls the rotary electric machine or by a battery control section that controls the battery.

With a fifteenth means, the allowable value calculation section, the transmitting section and the upper limit value setting section are provided with a rotary electric machine control section that controls the rotary electric machine or with a battery control section that controls the battery.

With the above configuration, each of the functions of the above-described allowable value calculation section, transmitting section and upper limit value setting section can be implemented by a rotary electric machine control section that controls the rotary electric machine, or by a battery control section that controls the battery.

BRIEF DESCRIPTION OF THE DRAWINGS

The above and other objectives, features and advantages of the present disclosure will be made clearer from the following detailed description, referring to the appended drawings. The drawings are.

DESCRIPTION OF EMBODIMENTS (First Embodiment)

Figure 1:
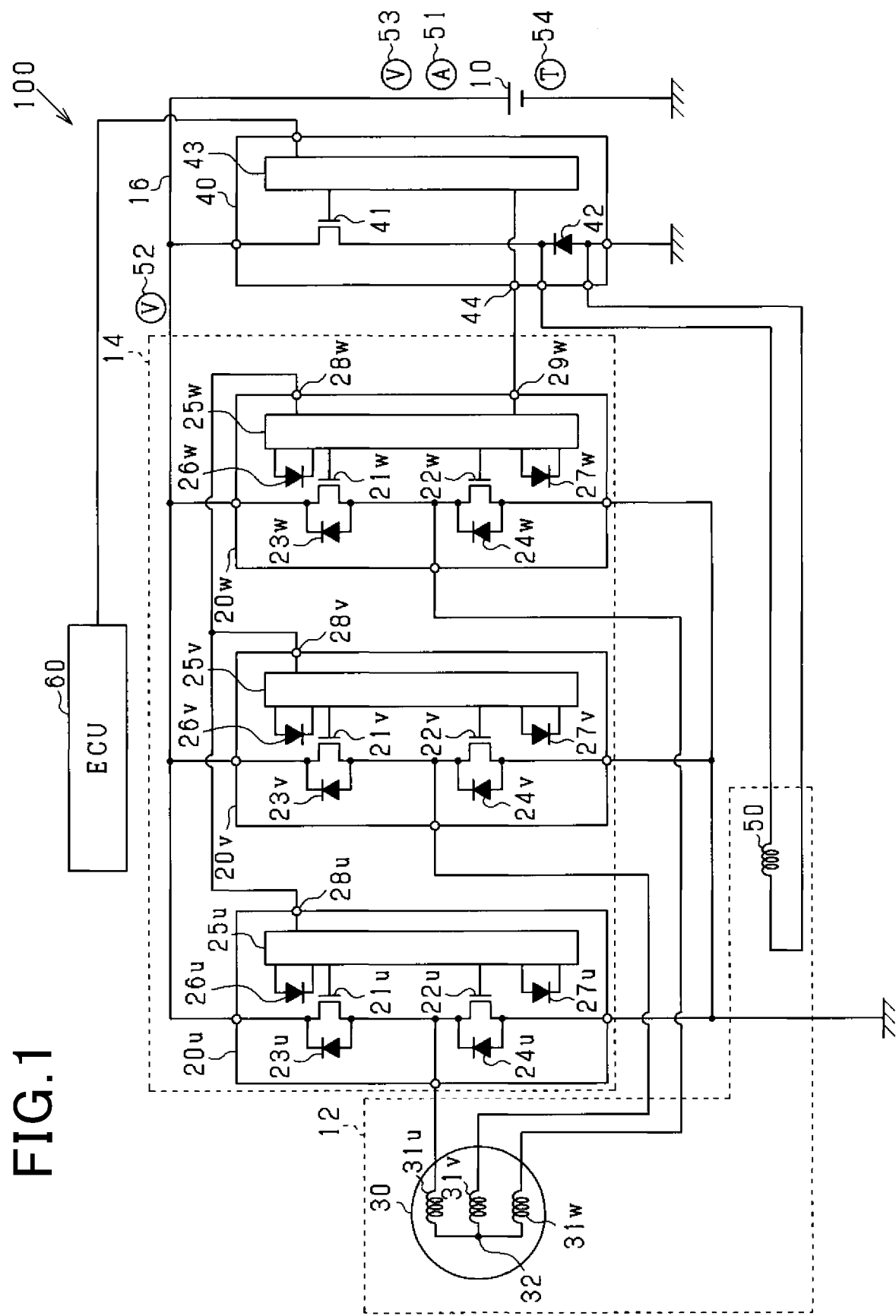
FIG. 1 is a general diagram of an in-vehicle system.

In the following, a first embodiment is described referring to the drawings, the embodiment being implemented as a control apparatus which is applied to an in-vehicle system that includes a rotary electric machine and a battery.

As shown in FIG. 1, in an in-vehicle system 100 (corresponding to a system), when a rotary electric machine 12 functions as an alternator (electric generator), the AC output current is rectified by an inverter 14 and electric power is supplied to a battery 10. However when the rotary electric machine 12 functions as a motor (electric motor), power supplied from the battery 10 is converted to AC current by the inverter 14. The battery is a lead-acid battery 10, having a terminal voltage of approximately 12 V, for example.

The inverter 14 is configured of a U-phase module $20u$, a V-phase module $20v$ and a W-phase module $20w$. These modules $20u$, $20v$, $20w$ of the inverter 14 are respectively connected to a U-phase winding $31u$, V-phase winding $31v$, and W-phase winding $31w$ that are wound on the stator 30 of the rotary electric machine 12.

The U-phase module $20u$ is equipped with a U-phase upper arm switching element $21u$ and a U-phase lower arm switching element $22u$, which are MOS FETs. The source electrode of the U-phase upper arm switching element $21u$ and the drain electrode of the U-phase lower arm switching element $22u$ are connected, and a first end of the U-phase winding $31u$ is connected to the connection point of these. On the other hand, the second end of the U-phase winding $31u$ is connected to a neutral point 32. Furthermore the drain electrode of the U-phase upper arm switching element $21u$ is connected to the positive terminal of the battery 10, while the source electrode of the U-phase upper arm switching element $22u$ is connected to ground. A U-phase upper arm diode $23u$ and a U-phase lower arm diode $24u$ are respectively connected in parallel with the U-phase upper arm switching element $21u$ and the U-phase lower arm switching element $22u$, in opposing directions. Opening and closing of the U-phase upper arm switching element $21u$ and the U-phase lower arm switching element $22u$ are controlled by the U-phase drive circuit $25u$.

The U-phase module $20u$ is further equipped with a U-phase upper arm temperature sensing diode $26u$ and a U-phase lower arm temperature sensing diode $27u$. The U-phase upper arm temperature sensing diode $26u$ is mounted close to the U-phase upper arm switching element $21u$, and can detect changes in temperature which cause heating of the U-phase upper arm switching element $21u$. Similarly the U-phase lower arm temperature sensing diode $27u$ is installed close to the U-phase lower arm switching element $22u$, to detect changes in temperature which cause heating of the U-phase lower arm switching element $22u$. The output values from the U-phase upper arm temperature sensing diode $26u$ and the U-phase lower arm temperature sensing diode $27u$ are inputted to the U-phase drive circuit $25u$.

The configurations of the V-phase module $20v$ and the W-phase module $20w$ are the same as for the U-phase module $20u$, and the manner of connection of the V-phase module $31v$ and the W-phase module $31w$ are the same as for the U-phase module $31u$, so that description is omitted. Essentially, the rotary electric machine 12 and the battery 10 are connected by the wiring harness 16 (corresponding to wiring). A current sensor 51 (corresponding to a current acquisition section) is connected to the wiring harness 16, for detecting the current I that flows in the wiring harness 16

(rotary electric machine 12, battery 10). Furthermore the wiring harness 16 is connected to a voltage sensor 52 that detects the voltage at the input/output terminals of the inverter 14, and is connected to a voltage sensor 53 that detects the voltage at the input terminal of the battery 10. The voltage sensor 52 and the voltage sensor 53 constitute a voltage drop acquisition section, which acquires the voltage drop AV in the wiring harness 16. A temperature sensor 54 which detects the temperature of the battery 10 is attached to the battery 10.

The U-phase module 20u is equipped with a U-phase connecting terminal 28u, for communicating with the V-phase module 20v and the W-phase module 20w. Similarly the V-phase module 20v and the W-phase module 20w are provided respectively with a V-phase connecting terminal 28v and a W-phase connecting terminal 28w. The U-phase drive circuit 25u, the V-phase drive circuit 25v and the W-phase drive circuit 25w are respectively connected for communication via the U-phase connecting terminal 28u, V-phase connecting terminal 28v, and W-phase connecting terminal 28w. Furthermore a regulator connecting terminal 29w is provided on the W-phase module 20w, and the W-phase drive circuit 25w is connected for enabling communication with the regulator 40 via this regulator connecting terminal 29w.

The regulator 40 is configured of a field switching element 41, a diode 42 and a control section 43. The regulator 40 controls the state of energization of the field winding 50 of the rotor. The field switching element 41 is for example a power MOSFET having the drain electrode connected to the positive terminal of the battery 10 and having the source electrode connected to the cathode of the diode 42. The anode of the diode 42 is connected to ground. The connection point of the field switching element 41 and the diode 42 is connected to one end of the field winding 50, and the other end of the field winding 50 is connected to ground. The open and closed state of the field switching element 41 is controlled by the control section 43 (corresponding to a rotary electric machine control section). Specifically, the control section 43 varies the duty value that expresses the proportion of energization interval in one control period (fixed period) of the field switching element 41.

The control section 43 is connected via the module connecting terminal 44 to the regulator connecting terminal 29w of the W-phase module 20w, and communicates with the W-phase drive circuit 25w. The control section 43 transmits drive commands of the switching elements 21u, 22u, 21v, 22v, 21w, 22w to the W-phase drive circuit 25w. Specifically, the control section 43 designates, for each of the switching elements 21u, 22u, 21v, 22v, 21w, 22w of the respective phase windings to which current is inputted, those for which the upper arm or the lower arm is to be set ON. The W-phase drive circuit 25w drives the W-phase upper arm switching element 21w and the W-phase lower arm switching element 22w based on the drive commands. Furthermore the drive commands are transmitted to the U-phase module 20u and to the V-phase module 20v. It should be noted that it would be equally possible for the judgement as to which of the upper arm switching elements 21u, 21v, 21w and lower arm switching elements 22u, 22v, 22w is to be set ON to be executed by the drive circuits 25u, 25v, 25w of the respective phases.

In addition, the W-phase drive circuit 25w obtains the detection values from the respective temperature sensing diodes 26u, 27u, 26v, 27v, 26w, 27w and outputs these detection values to the control section 43. The control section 43 transmits and receives signals to/from the ECU 60, which is a higher-level control section. The ECU 60 is an engine ECU that controls the engine of the vehicle, or a power manager ECU that performs overall control of electrical energy of the vehicle.

Next, the regeneration control that is executed by the in-vehicle system 100 will be described referring to the flow diagram of FIG. 2. This processing sequence is repetitively executed at fixed periods.

Firstly, the ECU 60 judges whether or not to request implementation of regeneration (step S11) based on the state of the vehicle and on the charging demand of the battery 10. If there is no request for regeneration (S11: NO) then the processing sequence is ended.

On the other hand if there is a request for implementing regeneration, then the ECU 60 calculates an electric power generation command value based on a braking torque demand and on the charging demand of the battery 10, the condition of electrical load, etc. (S12)

Next, the control section 43 obtains the allowable input value for the battery 10 (S13). This processing of step S13 is the sequence executed by the control section 43 shown in the flow diagram of FIG. 3.

Figure 3:
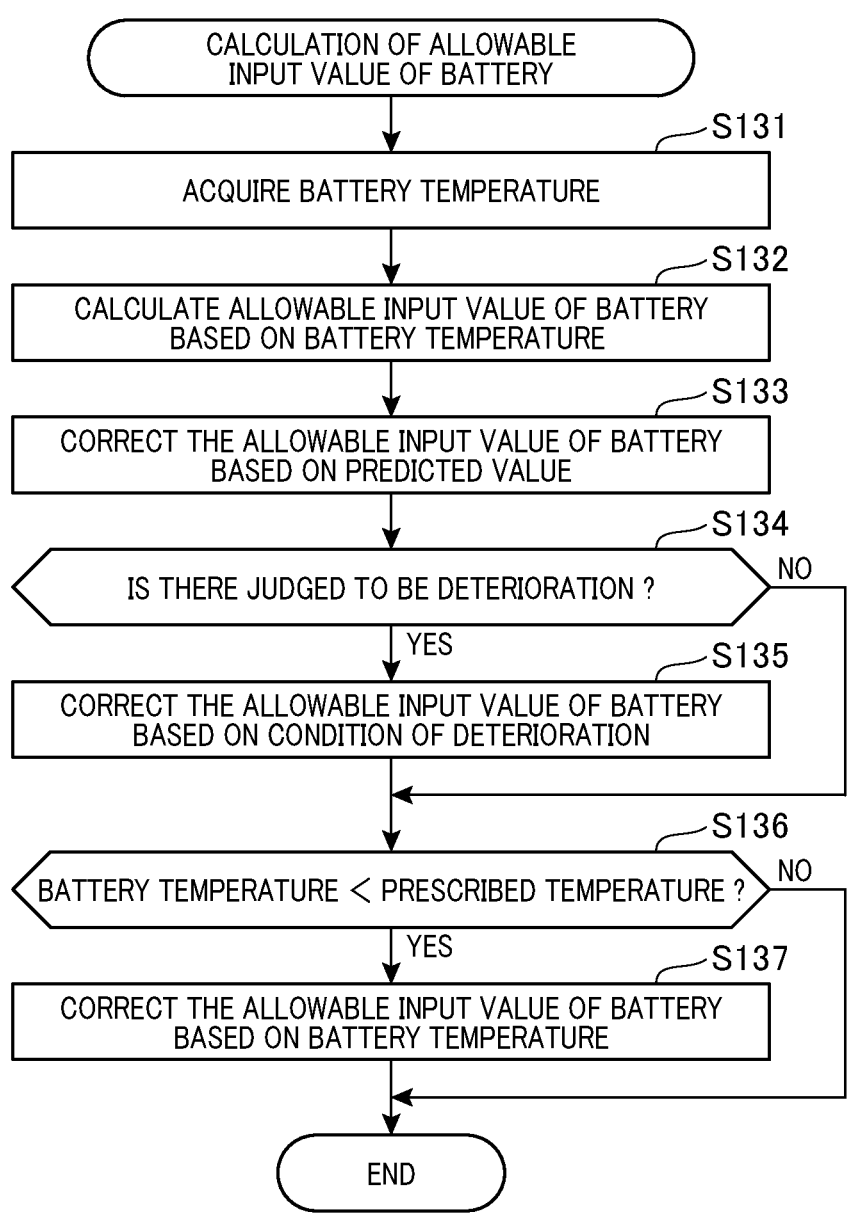
FIG. 3 is a flow diagram of a sequence for calculating an allowable input value for a battery.
Figure 4:
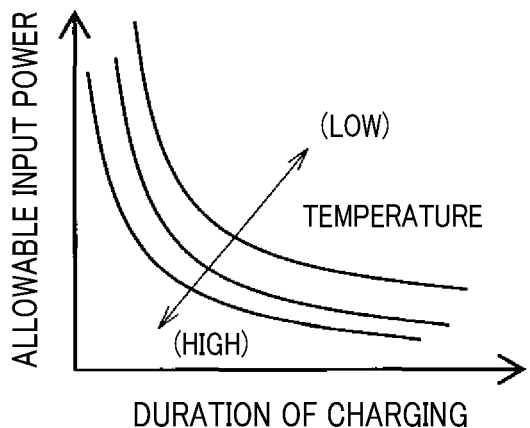
FIG. 4 is a map showing a relationship between a charging duration, battery temperature and allowable input power.

As shown in FIG. 3, firstly the temperature sensor 54 (corresponding to a temperature acquisition section) detects the temperature of the battery 10 (S131). Based on the detected temperature of the battery 10, the allowable input value for the battery 10 is calculated, which is the upper limit of allowable input to the battery 10 (S132). Specifically as shown in the map of FIG. 4, the duration of charging the battery 10 under regeneration control, and the temperature of the battery 10, are inputted to the map of FIG. 4, to calculate the allowable input power for the battery 10 (base value of allowable input power) as an allowable input value. With the map of FIG. 4, the longer the duration of charging, the shorter becomes the allowable input power, and the higher the temperature of the battery 10 is, the lower becomes the allowable input power.

The allowable input power of the battery 10 is corrected based on prediction of the temperature of the battery (S133). Specifically, the current temperature of the battery 10, the environmental temperature around the battery 10 and the charging current of the battery 10, etc., are applied in a map or an equation, for predicting the future temperature of the 10. The allowable input value of the battery is then corrected based on that predicted value. For example, the higher the predicted future value, the smaller become the battery allowable input value, as a result of the correction.

If the parameters that predict the future value of temperature are not appropriate, then there is a danger of lowering the accuracy of predicting the future value. For that reason, correction is applied to the parameters (map, coefficient of an equation, etc.) that predict the future value of temperature, with the correction being based on the predicted future temperature and the temperature that is detected by the temperature sensor 54. Specifically if the predicted future temperature and the temperature that is detected thereafter deviate from one another, then the parameters are corrected such as to suppress the deviation.

Next, a judgement is made as to whether or not there is deterioration of the battery 10 (S134). Specifically, the decision to whether there is deterioration of the battery 10 is made using a known method of deterioration measurement that is based on the internal resistance of the battery 10 (S134). If it is judged that there is deterioration of the battery 10 (S134: YES) then correction is applied to the allowable input value for the battery, based on the state of the deterioration (S135). For example if there is advanced deterioration of the battery 10, then when the output power of the rotary electric machine 12 is increased there will be a danger that the deterioration will be further advanced. For that reason, the greater the degree of advancement of the deterioration of the battery 10, the smaller is made the allowable input value for the battery.

Next, a decision is made as to whether or not the temperature of the battery 10 is lower than a prescribed temperature (S136). For example if the temperature of the battery 10 is lower than the prescribed temperature (0°, etc.) then there will be a danger that the battery 10 cannot provide sufficient capability. For that reason, if the temperature of the battery 10 that is detected by the temperature sensor 54 is lower than the prescribed temperature, then an allowable output value that is the upper limit value of allowable output from the battery 10 is calculated such as to be greater than a prescribed value of that allowable output. The prescribed allowable value could be calculated based on a map which defines relationships between the temperature of the battery 10 and correction values, or could be a fixed value that is predetermined such as to rapidly increase the temperature of the battery 10. This processing sequence is then temporarily ended (END). The processing of step S131 corresponds to processing executed as a temperature acquisition section, and the processing of step S134 corresponds to processing executed as a deterioration condition acquisition section.

Figure 5:
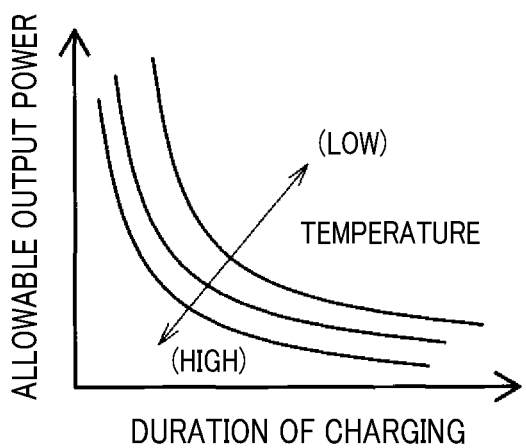
FIG. 5 is a map showing a relationship between power generation duration, rotary electric machine temperature, and allowable output power.

Returning to FIG. 2, the control section 43 obtains an allowable output value that is the limit value of allowable output from the rotary electric machine 12 (S14). Specifically, the duration of regeneration by the rotary electric machine 12 and the temperature of the rotary electric machine 12 are applied to the map shown in FIG. 5, to calculate the allowable output value for the rotary electric machine 12 as an allowable output power. With the map of FIG. 5, the smaller the duration of regeneration by the rotary electric machine, the lower becomes the allowable output power, and the higher the temperature of the rotary electric machine 12 the lower becomes the allowable output power. The detection values of the temperature sensing diodes 26u, 27u, 26v, 27v, 26w, 27 may be used as the temperature of the rotary electric machine 12, or it would be equally possible to detect the temperature of the stator 30, etc., Next, an allowable energization value is obtained, that is the upper limit value for input to the wiring harness 16. (S15) Specifically, the allowable energization value that is the upper limit value for input to the wiring harness 16 is obtained by applying the duration of energization of the wiring harness 16 and the temperature of the wiring harness 16 to a map, that is of the same form as those of FIGS. 4 and 5. It should be noted that if the wiring harness 16 incorporates a fuse, then it would be equally possible to take the capacity of the fuse into consideration in calculating the allowable energization value for the wiring harness 16.

Figure 6:
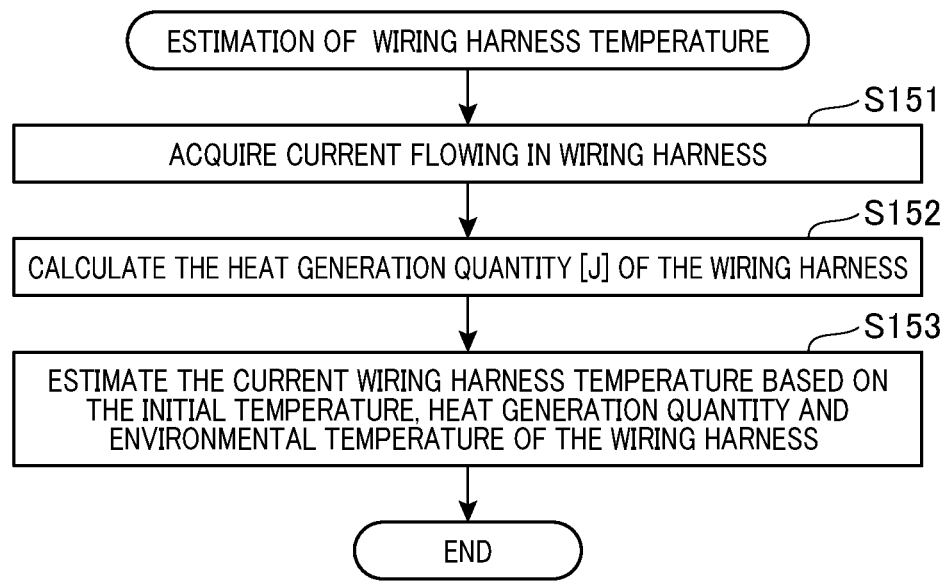
FIG. 6 is a flow diagram of a processing sequence for wiring harness temperature estimation.

The processing sequence for estimating the temperature of the wiring harness 16 will be described referring to the flow diagram of FIG. 6. This processing sequence is executed repetitively by the control section 43 at fixed periods.

Firstly, the current that is flowing in the wiring harness 16 is obtained (S151). Specifically, the current I flowing in the wiring harness 16 is detected by means of the current sensor 51.

Next, based on the detected current I and the resistance R of the wiring harness 16, the heat generation quantity Q[J] of the wiring harness 16 is calculated (S152). Specifically, the calorific value Q is calculated using the equation: Q=resistance R×current $I^2$×time t. The resistance R is calculated based on the current I flowing in the wiring harness 16 and the voltage drop ΔV in the wiring harness 16. That is to say, the resistance R is calculated using the equation: resistance R=voltage drop ΔV/current I. The voltage drop ΔV is the difference between the voltage at an input/output terminal of the inverter 14 that is detected by the voltage sensor 52 and a voltage at an input/output terminal of the battery 10 that is detected by the voltage sensor 53.

Next, based on the initial temperature and calorific value Q of the wiring harness 16, and on the environmental temperature, the current temperature of the wiring harness 16 is estimated (S153). The initial temperature is taken to be the environmental temperature around the wiring harness 16. Specifically, the temperature of the wiring harness 16 is estimated by using a known method of temperature estimation that is based on a heat conduction equation, etc. It should be noted that the accuracy of estimating the temperature of the wiring harness 16 could be enhanced by taking into consideration the effects of air currents that are caused by the vehicle travel, or are produced by fans, etc. The processing sequence is then ended. The processing of S13-S15 corresponds to processing executed as an allowable value calculation section, while the processing of S151-S153 corresponds to processing executed as a temperature estimation section (temperature acquisition section). Furthermore it would be equally possible to detect the temperature of the wiring harness 16 by using a temperature sensor.

Returning to FIG. 2, the ECU 60 calculates the limit of the allowable value of electric power generation is calculated as the upper limit value of the power generation command, based on the respective allowable values for the battery 10, the control section 11 and the wiring harness 16. The respective allowable values for the battery 10, the control section 12 and the wiring harness 16 are transmitted by the control section 43 to the ECU 60. The transmitting processing corresponds to processing executed as a transmitting section. This processing S16 is executed by the ECU 60 is executed by the sequence of the flow diagram of FIG. 7.

Firstly, the allowable generated power [W] is calculated based on the allowable output value [W] for the rotary electric machine 12, the allowable input value [W] for the battery 10, and the allowable energization value [W] for the wiring harness 16 (S161). Specifically, the smallest one of the allowable output value for the rotary electric machine 12, the allowable input value [W] for the battery 10 and the allowable energization value [W] for the wiring harness 16 becomes the allowable generated power [W] (corresponding to an upper limit output value). That is to say, the upper limit output value is set based on the allowable output values (allowable input values) that are received as a command receiving side, and with this embodiment, the upper limit output value is set as the lowest one of the respective allowable values (corresponding to allowable output values) for the objects whose temperatures are acquired.

Next, based on the calculated allowable generated power [W], the allowable value of power generation torque is calculated as the upper limit value of a power generation torque command (S162). Specifically, the upper limit value of power generation torque [Nm] is calculated using the equation: upper limit value of power generation torque [Nm]=allowable generated power [W]/rotation speed [rad/s]×power generation factor (%). The rotation speed [rad/s] is the rotation speed of the rotary electric machine 12. The power generation factor (%) is the rate at which the rotary electric machine 12 converts kinetic energy to electrical energy, when regeneration is being performed. It should be noted that this not limited to the above equation, and that it would be equally possible to use a map, etc., for converting the allowable generated power [W] to an upper limit value of power generation torque [Nm]. This processing sequence is then ended. The processing of step S16 corresponds to processing executed as an upper limit value setting section.

Returning to FIG. 2, the ECU 60 next restricts the power generation command value by a power generation command upper limit value (S17). Specifically, the smallest one of the power generation command value and the power generation command upper limit value is set as a new power generation command value. Next, the ECU 60 implements regeneration by the rotary electric machine 12, based on the power generation command value that has been set (S18). Specifically, the duty value that controls the state of energization of the field winding 50 is changed by the control section 43 such as to cause the rotary electric machine 12 to generate the command value of power. It should be noted that the power generation command value is not limited to being the power generation torque, and it would be equally possible to use the power generation voltage, the power generation current, the field current, the field duty value, etc. This processing sequence is then ended (END).

The embodiment described in detail above has the following advantages.

The temperatures of the battery 10, the rotary electric machine 12 and the wiring harness 16 are acquired. The allowable output value from the rotary electric machine 12 is then calculated for each of the objects whose temperature is acquired, with the calculation based on the acquired temperatures. For that reason, the allowable output value from the rotary electric machine 12 can be calculated taking into consideration the temperatures of the battery 10, the rotary electric machine 12 and the wiring harness 16.

The control section 43 transmits to the ECU 60 the allowable values that have been calculated for the respective objects. Hence the ECU 60 can set the upper limit output value (allowable generated power) for the rotary electric machine 12 based on the allowable output values for the battery 10, the rotary electric machine 12 and the wiring harness 16. Accordingly it is made possible to prevent excessive temperature rise of the battery 10, the rotary electric machine 12 or the wiring harness 16, while also making it possible to set the upper limit output value such as to increase the output from the rotary electric machine 12.

The upper limit output value for the rotary electric machine 12 can be appropriately set as the optimum upper limit output value for the entire in-vehicle system 100, taking into consideration the allowable output values for the rotary electric machine 12, the battery 10 and the wiring harness 16. As a result, the effective output power from the rotary electric machine 12 can be increased without requiring excessively increased capabilities for the battery 10 and the wiring harness 16.

The allowable output value from the rotary electric machine 12 is calculated based on the duration of inputting and outputting electric power between the rotary electric machine 12 and the battery 10. As a result, the allowable output value for the rotary electric machine 12 can be more appropriately calculated.

The current flowing in the wiring harness 16 is acquired by means of the current sensor 51, and the temperature of the wiring harness 16 is estimated based on the acquired value of current and the resistance of the wiring harness 16. For that reason it becomes possible to omit a temperature sensor for the wiring harness 16.

The resistance of the wiring harness 16 is calculated based on the current flowing in the wiring harness 16 and on an obtained voltage drop in the wiring harness 16. As a result, the resistance of the wiring harness 16 can be accurately calculated, and the temperature of the wiring harness 16 can be accurately calculated. In turn, the allowable output value for the rotary electric machine 12 can be calculated appropriately, and the upper limit output value from the rotary electric machine 12 can be appropriately set by using that allowable output value.

The current temperature of the battery 10, the environmental temperature of the surroundings of the battery 10 and the charging current of the battery 10, etc., are applied to a map or an equation, to predict the future temperature value of the battery 10. Since the allowable output value is corrected based on the predicted future temperature, the allowable output value can be more appropriately calculated, taking into consideration the future temperature value.

The parameter used for predicting the future value is corrected based on the predicted future temperature and the temperature value that is acquired by means of the temperature sensor 54. As a result if there is a deviation between the predicted future value and the actual temperature value, the accuracy of predicting the future value can be increased by correcting the parameter used in that prediction.

The state of deterioration is obtained for an object (for example the battery 10) whose temperature is acquired. The allowable output value can then be appropriately corrected, taking into consideration the state of deterioration of the object whose temperature is acquired.

If the temperature of the battery 10 is lower than a prescribed temperature, then the allowable output value is calculated such as to be greater than a prescribed allowable value. The power that is inputted and outputted to/from the battery 10 can thereby be increased, and temperature increase of the battery 10 can be promoted. Hence, the capability of the battery 10 can soon be secured.

The lowest one of the respective allowable output values of the objects is set as the upper limit output value. Hence, excessive temperature increase can be prevented, for all of the objects.

The following modifications could be implemented for the above embodiment.

It would be equally possible for the control section 43 to calculate the allowable input value for the battery 10 such as to make the predicted future temperature value of the battery 10 become lower than a target temperature. With such a configuration, when it is required to maintain the temperature of the battery 10 below the target temperature, the allowable input value can be calculated such as to obtain that effect. It should be noted that this is not limited to the battery 10, and it would be equally possible to make the predicted future temperature value of some other object whose temperature is acquired become lower than a target value, by calculating the allowable output value for the object such as to achieve that effect.

The efficiency of inputting and outputting electric power between the rotary electric machine 12 and the battery 10 varies in accordance with the conditions of the rotary electric machine 12 and the battery 10. When regeneration is performed continuously by the rotary electric machine 12, kinetic energy can be more effectively utilized by operating at maximum efficiency after a certain time has elapsed, than by temporarily operating at maximum output. In that respect, it would be equally possible for the control section 43 to calculate the efficiency that will be attained for inputting and outputting electric power between the rotary electric machine 12 and the battery 10 after some time has elapsed, and to correct the allowable output value such as to maximize the efficiency. For example, the amount of temperature increase of the battery 10 when regeneration operation is performed for a prescribed duration could be predicted, and the allowable output value could be corrected such as to maximize the power conversion efficiency of the battery 10 after the prescribed duration has elapsed. With such a configuration, not only can the effective output power of the rotary electric machine 12 be increased, but energy can be effectively utilized. Furthermore, the allowable output value could be corrected such that the output from the battery 10 will reach a maximum after a prescribed interval has elapsed.

It would be equally possible to omit the processing for correcting the parameters which predict the future value based on the predicted future temperature and the temperature that is detected by the temperature sensor 54. It would also be possible to omit the processing of S133.

It would also be possible to omit the processing of S134 and S135. It would moreover be possible to omit the processing of S136 and S137.

It would also be possible for the ECU 60 to set, as the upper limit value of output, the allowable output value of the one of the objects whose acquired temperature is closest to an upper limit value of temperature of the objects. With such a configuration, excessive temperature increase can be suppressed, even for the object whose temperature is closest to the upper limit value of temperature of the objects.

It is not necessary for the charging duration or the power generation duration to be restricted to an actual continuation interval, and a predicted continuation interval could be used (duration prediction section). Furthermore it would also be possible to calculate the allowable output values for the respective objects based on the temperature of each object, without taking into consideration the charging duration or the power generation duration.

With the above embodiment, the temperatures of the battery 10, the rotary electric machine 12 and the wiring harness 16 are acquired and an allowable output value from the rotary electric machine 12 is calculated based on these temperatures of the respective objects. However, it would be equally possible to acquire the temperature of at least one of the battery 10 and the wiring harness 16, and to calculate the allowable output value for the rotary electric machine 12 based on that temperature. Furthermore it would also be possible to acquire the temperatures of at least two of the rotary electric machine 12, the battery 10 and the wiring harness 16, and to calculate the allowable output value for the rotary electric machine 12 based on these temperatures.

A predetermined fixed value could be used as the resistance R of the wiring harness 16.

The battery 10 is not limited to being a lead-acid battery and a lithium battery or the like could be utilized.

Figure 2:
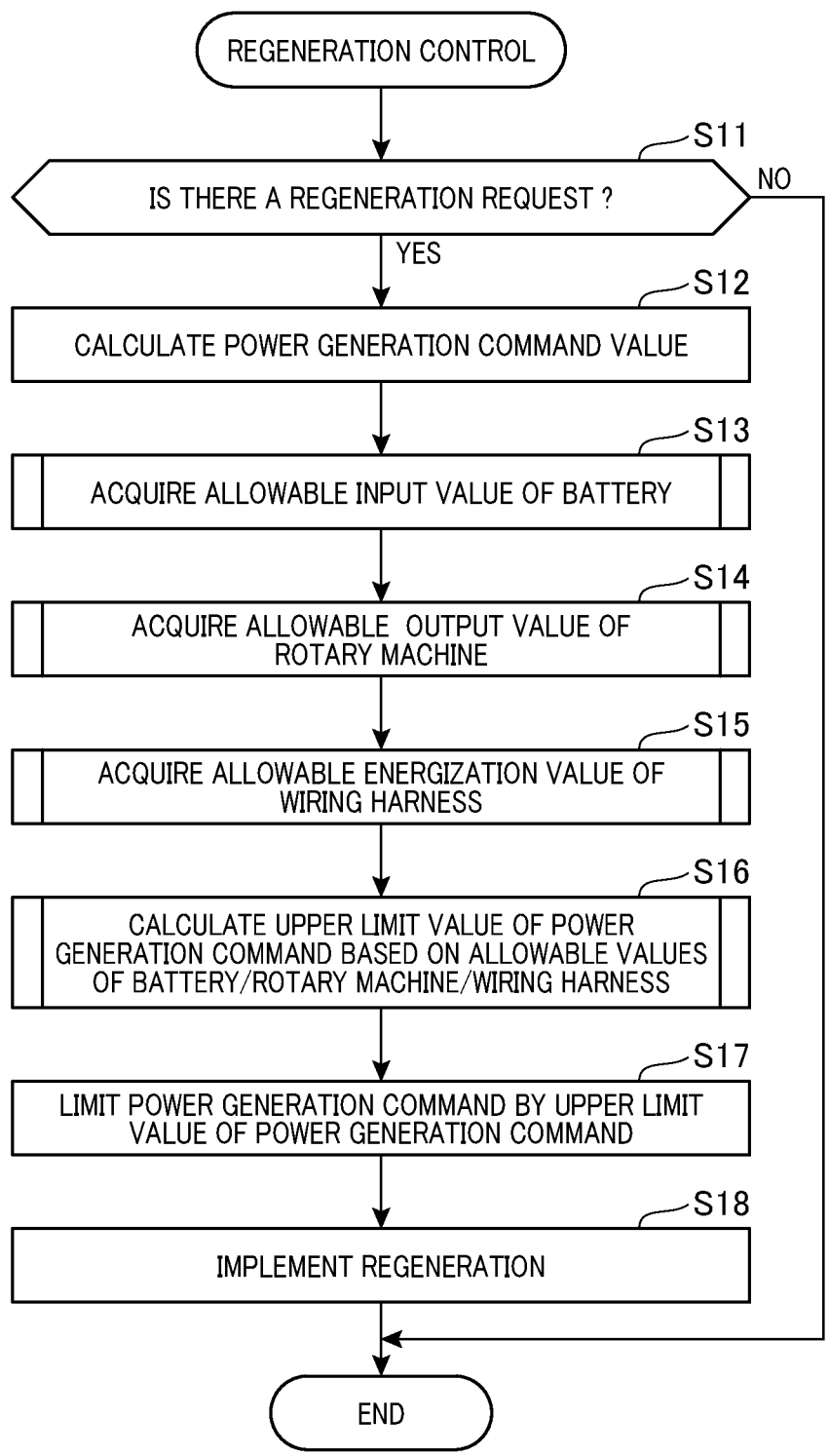
FIG. 2 is a flow diagram of a processing sequence of a rotary electric machine.

The upper limit value of the drive command, for drive control of the rotary electric machine 12, could be calculated instead of calculating the upper limit value of the power generation command as in FIG. 2, for regeneration control. In that case, processing based on the above embodiment could be executed whereby, together with changeover from power generation to drive, inputting and outputting between the battery 10 and the rotary electric machine 12 is reversed. Furthermore an electric generator, an electric motor, an ISG (Integrated Starter Generator), or a MG (Motor Generator), etc., could be used as the rotary electric machine 12.

(Second Embodiment)

A sequence for calculating the upper limit value of the power generation command with a second embodiment will be described referring to the flow diagram of FIG. 8, with the description being centered on points of difference from the first embodiment. This processing sequence is executed by the ECU 60, and is a modified form of the processing used for calculating the upper limit value of the power generation command shown in FIG. 7.

Firstly, the allowable output value [W] for the rotary electric machine 12, the allowable input value[W] for the battery 10 and the allowable energization value [W] for the wiring harness 16 are calculated. (S161A) Here, weighting of the respective allowable values is performed, by multiplying the allowable values by coefficients $\alpha$, $\beta$, $\gamma$ respectively.

Specifically, the control section 43 predicts the future temperature values of the rotary electric machine 12, the battery 10 and the wiring harness 16. This corresponds to processing executed as a temperature prediction section. Next, based on the allowable output values and the future temperature values for the respective objects, the ECU 60 calculates the integrated value of electric power that continues to be inputted and outputted between of the rotary electric machine 12 and the battery 10 during a prescribed time, and sets the coefficients $\alpha$, $\beta$, $\gamma$ such as to maximize the integrated value. For example in the case of the coefficient of an object for which an increase in temperature causes a large reduction in the allowable value, that coefficient could be set to a smaller value than the coefficient of an object for which only a small reduction in the allowable value is caused by a temperature increase. The smallest one of the allowable values that have been weighted in this way, can then be set as the allowable generated power [W] (corresponding to an upper limit output value). The integrated value can be calculated by calculating the sum of the electric power values of unit time.

Next, based on the allowable generated power [W] thus calculated, the upper limit value of power generation torque is calculated, as the upper limit value of the power generation command (S162A). The processing of S162A is the same as for S162. The processing sequence is then ended. It should be noted that the processing of S161A corresponds to processing executed as an upper limit value setting section.

With this embodiment, future values of temperature are predicted for each of the objects concerned. An integrated value of electric power that will be inputted and outputted between the rotary electric machine 12 and the battery 10 for a prescribed duration is then calculated, based on the predicted future temperature values of the respective objects, and the allowable output value is are set such as to maximize that integrated value. Hence when electric power is inputted and outputted between the rotary electric machine 12 and the battery 10 for the prescribed duration, maximum use can be made of the energy.

(Third Embodiment)

A sequence for calculating the upper limit value of the power generation command with a third embodiment will be described referring to the flow diagram of FIG. 8, with the description being centered on points of difference from the second embodiment.

With this embodiment, based on the allowable output values and future temperature values for each of the respective objects, the ECU 60 sets the coefficients $\alpha$, $\beta$, $\gamma$ such as to maximize the efficiency of inputting and outputting electric power between the rotary electric machine 12 and the battery 10 for a prescribed duration. For example, the coefficient of the object for which the efficiency is lowered to the greatest extent by a rise in temperature could be set at a smaller value than that of the coefficient of the object for which the efficiency is lowered to the smallest extent by a rise in temperature. The wiring harness 16 corresponds to the object for which the allowable value is lowered to the smallest extent by a rise in temperature. The smallest one of the allowable values that are weighted in this way is made the allowable generated power [W] (corresponding to the upper limit output value).

With this embodiment, predicted future temperature values are obtained for each of the objects concerned. The efficiency of inputting and outputting electric power between the rotary electric machine 12 and the battery 10 that will be attained after a prescribed time is then calculated, based on the allowable output value and on the future temperature values predicted for the respective objects, and the allowable output value is set such that the efficiency will reach a maximum. Hence, not only can the effective output from the rotary electric machine 12 be increased, but also energy can be efficiently utilized.

(Fourth Embodiment)

Figure 9:
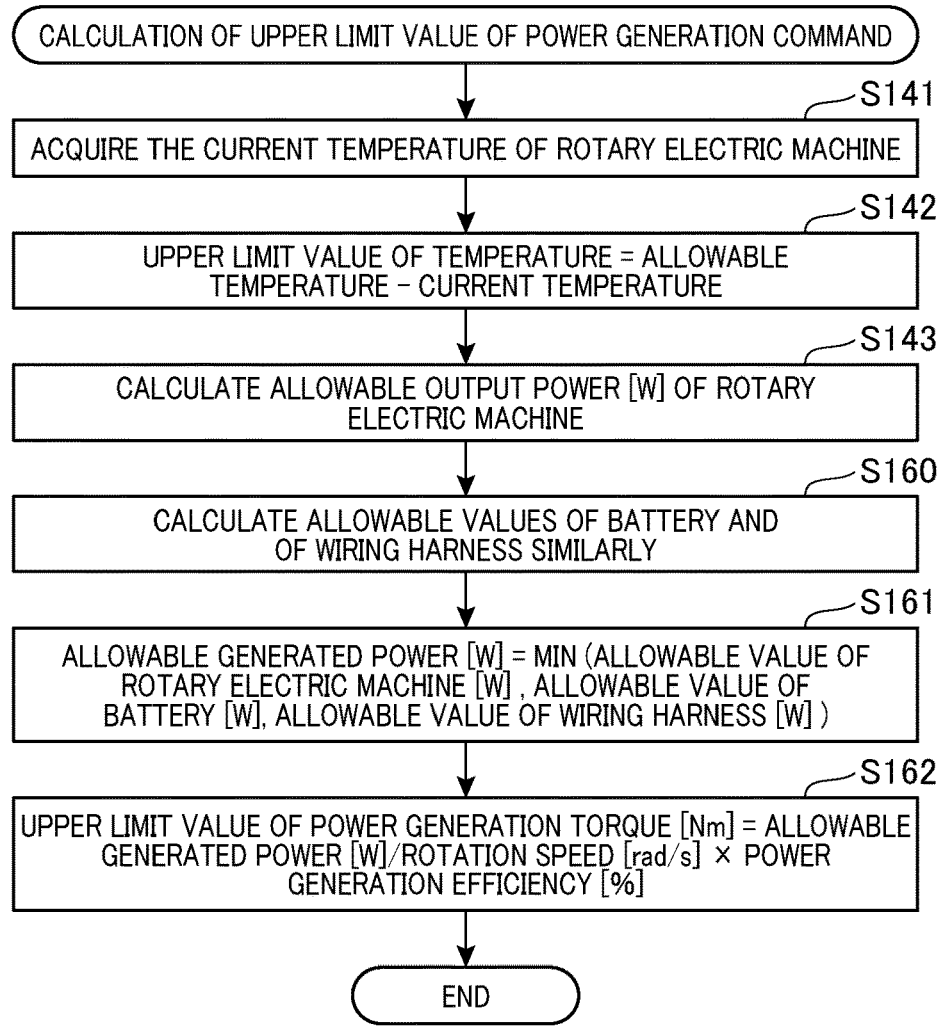
FIG. 9 is a flow diagram of a processing sequence for calculating an upper limit value of a power generation command with a fourth embodiment.

A sequence for calculating the upper limit value of the power generation command with a fourth embodiment will be described referring to the flow diagram of FIG. 9, with the description centered on points of difference from the first embodiment. This sequence is a modification of the processing of S13 to S15 in FIG. 2 and the processing for calculating the upper limit value of the power generation command shown in FIG. 7. Processing steps that are identical to processing steps of the first embodiment are designated by the same step numerals as for the first embodiment, and description is omitted.

Figure 10:
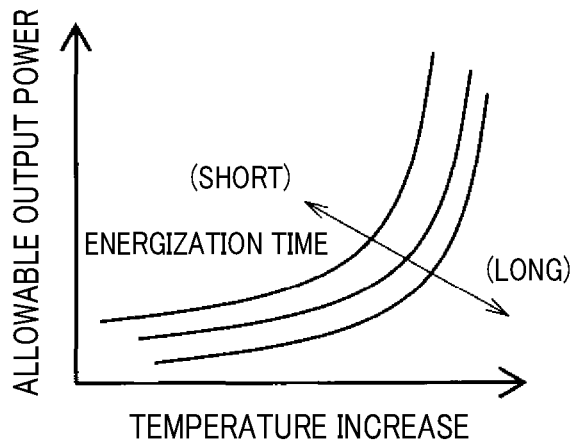
FIG. 10 is a map showing a relationship between temperature increase, charging duration, and allowable output power.

Firstly, the control section 43 acquires the current temperature of the rotary electric machine 12 (S141). The allowable temperature (target temperature) of the rotary electric machine 12 is subtracted from the current temperature, and a limit value of temperature increase is calculated (S142). Based on the limit value of temperature increase, the energization time, and the relationship between these and allowable generated power, the allowable generated power [W] value of the rotary electric machine 12 is calculated (S143). Specifically, the limit value of temperature increase and the energization time are applied to the map shown in FIG. 10, for calculating the allowable generated power [W] as the allowable output value for the rotary electric machine 12, such that the temperature increase will not exceed the limit value of temperature increase. An estimated value of the energization time is used, estimated based on the vehicle speed, driver operations, etc. With the map of FIG. 10, the greater the value of allowable generated power [W], the greater becomes the temperature increase, and the longer the energization time, the greater becomes the temperature increase.

Figure 7:
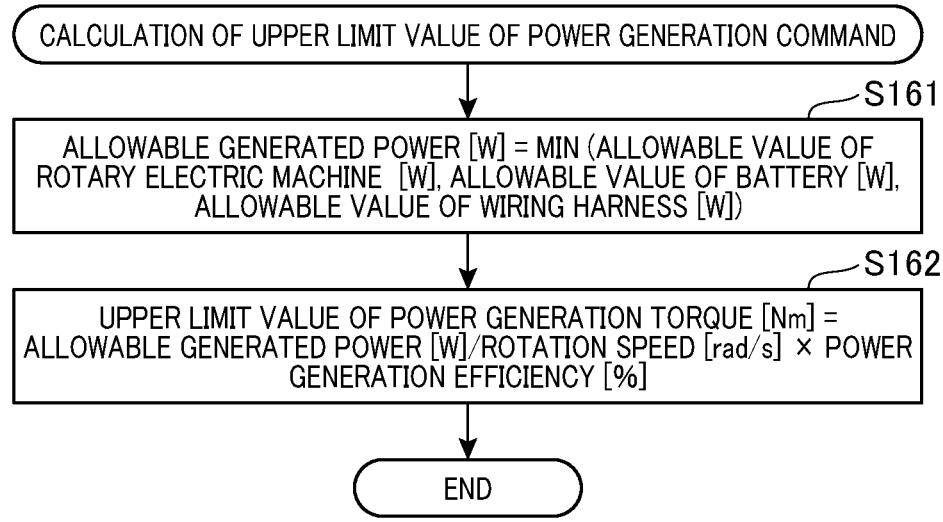
FIG. 7 is a flow diagram of a processing sequence for calculating an upper limit value of a power generation command with a first embodiment.
Figure 8:
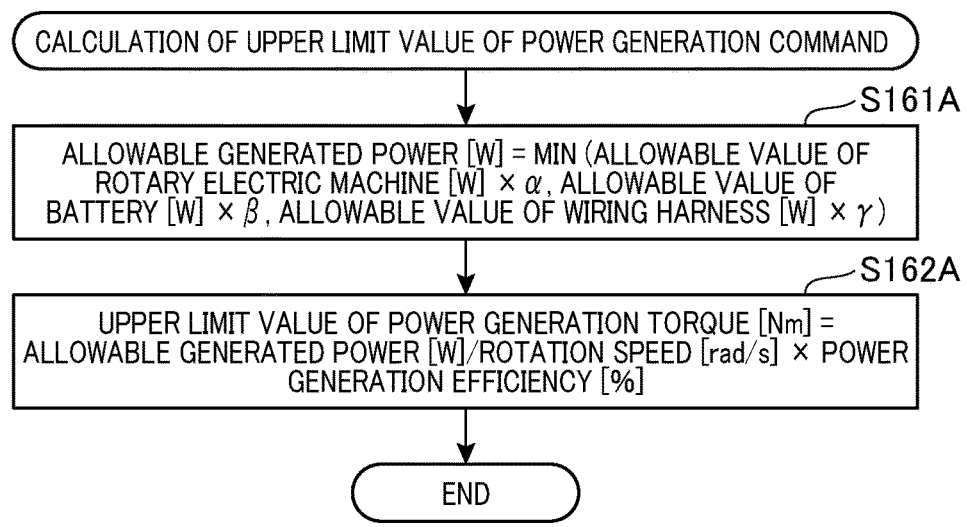
FIG. 8 is a flow diagram of a processing sequence for calculating the upper limit value of the power generation command with a second embodiment and a third embodiment.

Next the allowable output values [W] are calculated for the battery 10 and the wiring harness 16 by the processing of S160, S161, S162, which is the same as for FIG. 7. The processing of S141-S160 corresponds to processing executed as an allowable value calculation output section.

With this embodiment, upper limit values of output power are set based on the allowable output values and the future temperature values of the respective objects such that, when inputting and outputting electric power between the rotary electric machine 12 and the battery 10 is continued for a prescribed duration, the respective future temperature values of the objects will be lower than the allowable temperature values of the objects. Hence, when it is required to maintain the temperature of each of the objects lower than the allowable temperature value for the object, the allowable output value is calculated such as to achieve that result.

(Fifth Embodiment)

Figure 11:
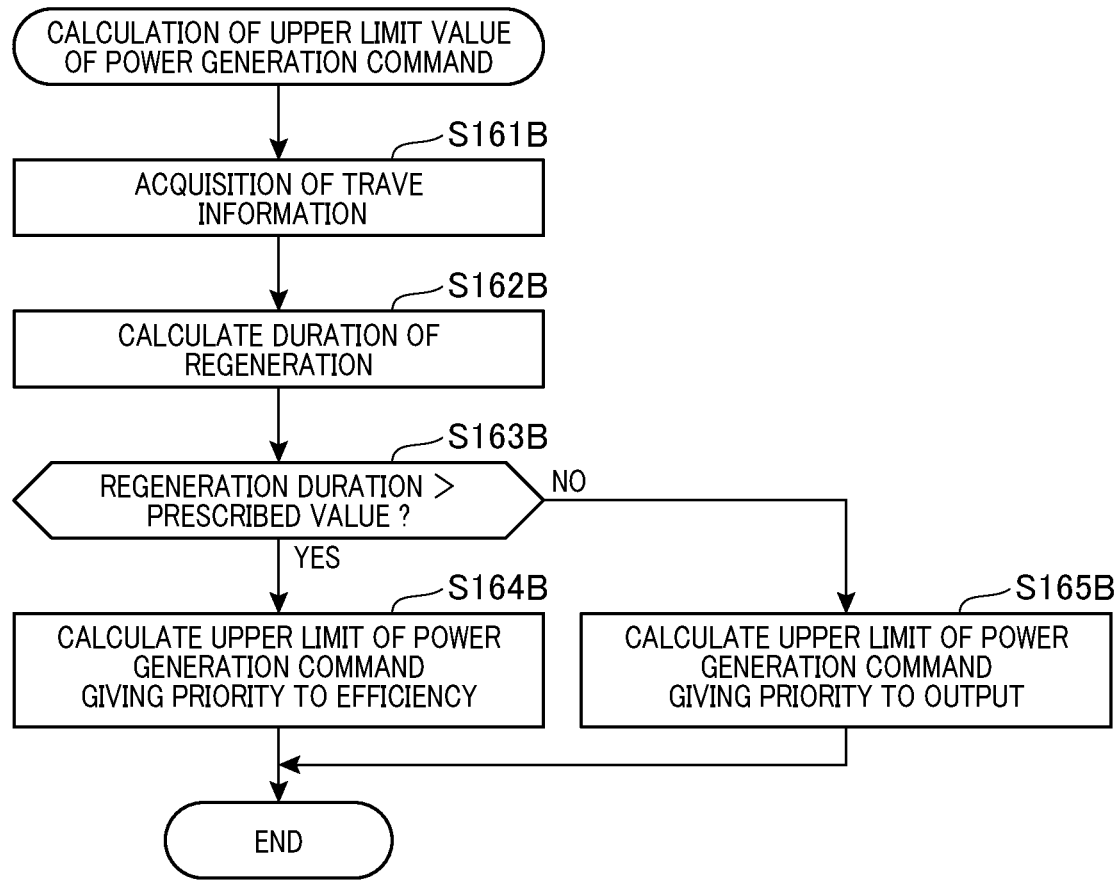
FIG. 11 is a flow diagram of a processing sequence for calculating an upper limit value of a power generation command with a fifth embodiment.

A sequence for calculating the upper limit value of the power generation command with a fifth embodiment will be described referring to the flow diagram of FIG. 11, with the description centered on points of difference from the second embodiment. A point of difference is that in S161A of the processing shown in FIG. 8 for calculating the upper limit value of the power generation command, the calculation method uses the coefficients $\alpha$, $\beta$, $\gamma$, with that processing sequence being executed by the ECU 60.

Firstly, travel information for the vehicle is acquired (S161B). The vehicle speed and the slope of the road on which the vehicle is traveling are acquired, as the travel information. The slope may be obtained as a detection value from a slope sensor, or obtained as information from a vehicle navigation apparatus, etc.

Figure 12:
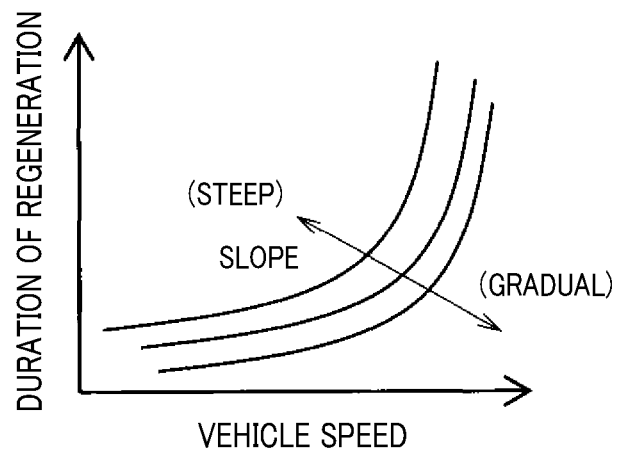
FIG. 12 is a map showing a relationship between vehicle speed, slope, and regeneration duration.

Next, based on the vehicle speed and the slope, the regeneration duration is calculated (S162B). Specifically, the vehicle speed and the degree of slope are applied to the map shown in FIG. 12, to calculate the regeneration duration. With the map of FIG. 12, the higher the vehicle speed, the longer becomes the regeneration duration, and the steeper the slope, the longer becomes the regeneration duration.

Next, a decision is made as to whether the regeneration duration is longer than a prescribed value (corresponding to a threshold value) (S163B). If the regeneration duration is judged to be longer than the prescribed value (S163B: YES) then the upper limit value of the regeneration command is calculated with priority being assigned to achieving high efficiency of output from the rotary electric machine 12 (S164B). Specifically, in the same way as for the third embodiment, coefficients $\alpha$, $\beta$, $\gamma$ are set such that the efficiency that will be attained for inputting and outputting electric power between the rotary electric machine 12 and the battery 10 will become maximized after a prescribed time.

On the other hand, If the regeneration duration is judged not to be longer than the prescribed value (S163B: NO) then the upper limit value of the regeneration command is calculated with priority being assigned to achieving a high output from the rotary electric machine 12 (S165B). Specifically, in the same way as for the second embodiment, the coefficients $\alpha$, $\beta$, $\gamma$ are set such as to maximize the integrated value of electric power that will be inputted and outputted between the rotary electric machine 12 and the battery 10 for a prescribed duration. Based on the calculated allowable generated power [W], the upper limit value of power generation torque is then calculated, as the upper limit value of the power generation command. The processing of S161B-S165B corresponds to processing executed as an upper limit value setting section.

If the duration for which the inputting and outputting electric power between of the rotary electric machine 12 and the battery 10 continues is short, then since the amount of temperature increase of the respective sections will be small, it is effective to make the output from the rotary electric machine 12 high. On the other hand if the duration of inputting and outputting electric power between of the rotary electric machine 12 and the battery 10 is long, then it is effective to continue the output from the rotary electric machine 12 for the long duration in a condition in which the output efficiency is high.

With this embodiment, if the predicted duration of output from the rotary electric machine 12 is shorter than a threshold value, then the upper limit value of the output is set by giving priority to a high output, while if the predicted duration of output is longer than the threshold value, then the upper limit value of the output is set by giving priority to high output efficiency. For that reason, the upper limit output value from the rotary electric machine 12 can be appropriately set in accordance with the duration for which inputting and outputting electric power between the rotary electric machine 12 and the battery 10 is continued.

The following modifications may be made to the above embodiments.

Figure 13:
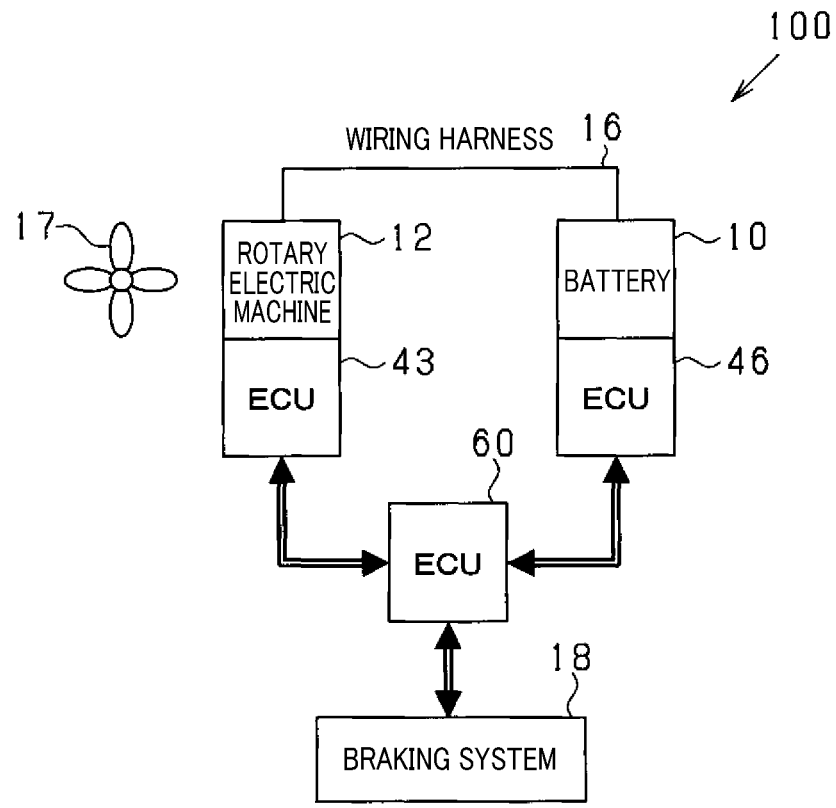
FIG. 13 is a general diagram showing a modified example of an in-vehicle system.

As shown in FIG. 13, the in-vehicle system 100 is equipped with a fan 17 for cooling the 12, and it would be equally possible to for the control section 43 to control the operation of the fan 17 (corresponding to a cooling control section). The ECU 60 (corresponding to a cooling input section) would receive from the control section 43, as an input, the state of the cooling control). The ECU 60 could then set the upper limit output value based also on the inputted state of cooling control. With such a configuration, the upper limit output value can be set while taking into consideration the state of the cooling control, and hence the effective output from the rotary electric machine 12 could be further increased. It should be noted that such cooling control is not necessarily limited in application to the rotary electric machine 12, but could equally be executed for the battery 10 or the wiring harness 16. The coolant temperature, etc., could be taken into consideration, as the state of cooling control.

Furthermore it would be equally possible for the ECU 60 to transmit commands for increasing the cooling control output, if the upper limit values of output for the respective objects are set such as to exceed the allowable output values of these objects. With such a configuration, if there is a danger of excessive temperature increase for the respective objects, the temperature increase can be suppressed by increasing the cooling control output.

As shown in FIG. 13, the in-vehicle system 100 is equipped with a braking system 18, and it would be equally possible for the ECU 60 (corresponding to a braking input section) to receive braking requests from the braking system 18. Braking requests are requests for braking torque to be generated by the rotary electric machine 12. The ECU 60 could then, when a braking request is received, forcibly set the upper limit output value as a braking request-use upper limit output value. With such a configuration, if there is a need for braking torque to be generated by the rotary electric machine 12 for the safety of the vehicle, then the upper limit output value from the rotary electric machine 12 could be set such as to give priority to that need.

Alternatively, it would be possible for the ECU 60 to calculate a short term-use upper limit output value and a long term-use upper limit output value, as upper limit values of output, and to forcibly set the short term-use upper limit value as the upper limit output value when a braking request is inputted. Since the amount of temperature increase of the respective sections will only be small, in such a case of short-term output from the rotary electric machine 12, the short term-use upper limit output value can be made higher than the a long term-use upper limit output value. Furthermore, an interval during which braking requests are inputted continue only until the vehicle speed becomes reduced, and so will comparatively short. Hence, the short term-use upper limit output value could be forcibly set as the upper limit output value from the rotary electric machine 12 when a braking request is inputted. In that way, when it is necessary for braking torque to be generated for the safety of the vehicle, priority is given to that requirement, in setting the upper limit output value from the rotary electric machine 12.

Figure 14:
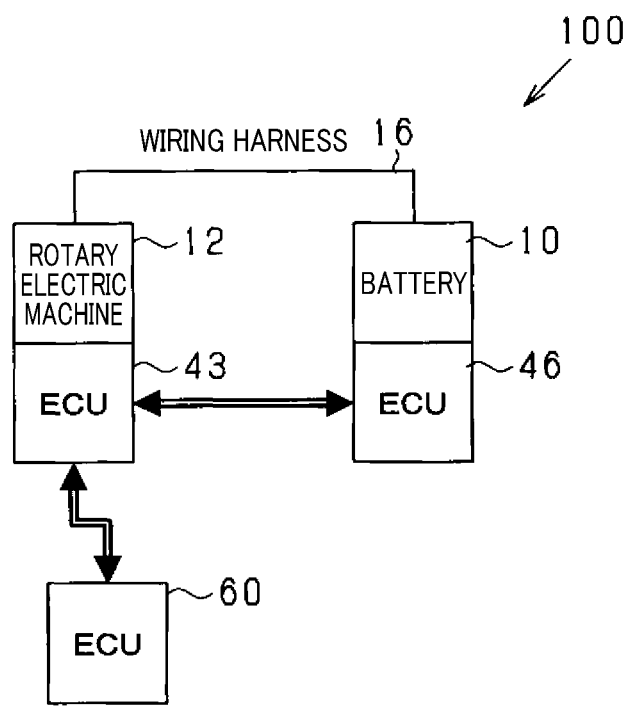
FIG. 14 is a general diagram showing another modified example of an in-vehicle system.

With the above embodiments, the allowable value calculation section and the transmitting section are provided with a control section 43 which controls the rotary electric machine 12, however it would be equally possible to provide a battery ECU 46 (corresponding to a battery control section) for controlling the battery 10. With such a configuration, respective functions of the above-described allowable value calculation section and transmitting section could be implemented by the battery ECU 46. Alternatively, it would be equally possible for the allowable value calculation section and the transmitting section to be provided in the control section 43 or in the battery ECU. In that case, when necessary information is received by the control section 43 or the battery ECU from the ECU 60, this would be done without executing processing for performing unnecessary communication, so that the responsiveness of control could be enhanced. As shown in FIG. 14, for example when it is necessary for the ECU 60 and the battery ECU 46 to transmit/receive necessary information, the control section 43 could serve as a relay. Similarly, the battery ECU 46 could serve as a relay.

Furthermore the invention is not limited to maximizing the efficiency of inputting and outputting of electric power in accordance with the condition of the rotary electric machine 12 or the battery 10, such that the efficiency reaches a maximum after a prescribed time, and kinetic energy could be more effectively utilized even if the efficiency is only made higher than the efficiency at the current time point after a prescribed time, during regeneration by the rotary electric machine 12. In that respect, it would be equally possible for the control section 43 to calculate the efficiency of inputting and outputting electric power between power between the rotary electric machine 12 and the battery 10 after a prescribed time, and to correct the allowable values such as to increase that efficiency beyond the efficiency at the current time point. With such a configuration, not only can the effective output from the rotary electric machine 12 be increased, but also energy can be effectively utilized. Furthermore, the allowable values could be corrected such as to make the output from the battery 10 become higher after a prescribed time than at the current time point.

Similarly, it would be equally possible to set the upper limit output value from the battery 10 such as to make the output from the battery 10 higher after a prescribed time than at the current time point.

Although the present disclosure has been described in accordance with embodiments, it is to be understood that the disclosure is not limited to these embodiments and structures. The present disclosure encompasses various modified forms and changes that are within an equivalent scope. Furthermore various combinations and forms, and other combinations and forms that include one or more elements, also come within the scope and range of concepts of the present disclosure.

The invention claimed is:

1. A control apparatus for controlling a rotary electric machine, applied to a system which includes the rotary electric machine, wiring, a battery that is connected to the rotary electric machine by the wiring, and an upper limit value setting section which sets an output upper limit value, that is an upper limit of an output command of the rotary electric machine, the control apparatus for controlling the rotary electric machine comprising:
   a temperature acquisition section which acquires temperatures of at least two of the rotary electric machine, the battery and the wiring;

an allowable output value calculation section which calculates, for each of objects whose temperature is acquired, an allowable output value that is an upper limit allowed for the output command of the rotary electric machine, based on the temperatures that are acquired by the temperature acquisition section;
a transmitting section which transmits to the upper limit value setting section the allowable output values calculated for each of the objects by the allowable value calculation sections a temperature prediction section which predicts future values of temperature that will be acquired by the temperature acquisition section for each of the objects; and
the upper limit value setting section that calculates an integrated value of electric power inputted and outputted between the rotary electric machine and the battery in a prescribed duration, based on the allowable output values of each of the objects and on the future values predicted by the temperature prediction section for each of the objects, and sets the output upper limit value to be higher than the integrated value.

2. The control apparatus for the rotary electric machine according to claim 1, wherein the allowable value setting section calculates the allowable output value for the rotary electric machine based further upon a duration for which electric power is inputted and outputted between the rotary electric machine and the battery.

3. The control apparatus for the rotary electric machine according to claim 1, wherein the upper limit value setting section sets a lowest one of the allowable output values of the respective objects as the output upper limit value.

4. The control apparatus for the rotary electric machine according to claim 1, wherein the upper limit value setting section sets, as the output upper limit value, the allowable output value of the one of the objects whose temperature, acquired by the temperature acquisition section, is closest to a temperature upper limit value of the objects.

5. The control apparatus for the rotary electric machine according to claim 1, wherein the upper limit value setting section calculates efficiency of inputting and outputting electric power between the rotary electric machine and battery for the prescribed duration, based on the allowable output values of each of the objects and on the future temperature values that are predicted for each of the objects by the temperature prediction section, and sets the output upper limit value such as to maximize the efficiency.

6. The control apparatus for the rotary electric machine according to claim 5, wherein
the temperature acquisition section acquires the temperature of the battery, and
when the battery temperature acquired by the temperature acquisition section is lower than a prescribed temperature, the upper limit value setting section calculates the efficiency of inputting and outputting to/from the battery after a prescribed time as the efficiency, and sets the allowable output value such as to maximize the efficiency of inputting and outputting to/from the battery.

7. The control apparatus for the rotary electric machine according to claim 1, wherein the upper limit value setting section sets the output upper limit values, based on the output upper limit values of the respective objects and on the future values of temperature predicted by the temperature prediction section for the respective objects, such that the future values predicted for each of the objects will become lower than respective target temperatures of the objects, when inputting and outputting of electric power between the rotary electric machine and the battery occurs for a prescribed duration.

8. The control apparatus for the rotary electric machine according to claim 1, wherein
the control apparatus for the rotary electric machine further includes a duration prediction section which predicts a duration of inputting and outputting of electric power between the rotary electric machine and the battery, in comprising the upper limit value setting section, and
when the duration predicted by the duration prediction section is shorter than a threshold value, the upper limit value setting section sets the output upper limit values by giving priority to a high output from the rotary electric machine, while when the duration is longer than the threshold value, the upper limit value setting section sets the output upper limit values by giving priority to output efficiency of the rotary electric machine.

9. The control apparatus for the rotary electric machine according to claim 1, wherein
the control apparatus for the rotary electric machine further includes a cooling input section that inputs a condition of a cooling control which cools at least one of the rotary electric machine, the battery and the wiring, and
the allowable output value setting section sets the output upper limit values based further on the condition of the cooling control, inputted by the cooling input section.

10. The control apparatus for the rotary electric machine according to claim 1, wherein
the system includes a cooling control section which performs cooling control, that cools at least one of the rotary electric machine, the battery and the wiring, and
when the upper limit value setting section sets an output upper limit value that exceeds the allowable output values of each of the objects, the upper limit value setting section transmits a command for increasing the output of the cooling control to the cooling control section.

11. The control apparatus for the rotary electric machine according to claim 1, wherein
the control apparatus for the rotary electric machine further includes a braking input section that inputs braking requests from a braking system of a vehicle, for causing braking torque to be generated by the rotary electric machine, and in comprising the upper limit value setting section, and
when a braking request is inputted by the braking input section, the upper limit value setting section forcibly sets the output upper limit value to a braking-use output upper limit value.

12. The control apparatus for the rotary electric machine according to claim 1, wherein
the control apparatus for the rotary electric machine further includes a braking input section that inputs braking requests from a braking system of a vehicle, for causing braking torque to be generated by the rotary electric machine, and in comprising the upper limit value setting section, and
the output upper limit value setting section calculates a short-period use output upper limit value and a long-period use output upper limit value as the output upper limit value, and forcibly sets the output upper limit value to the short-period use output upper limit value when the braking input section inputs a braking command.

13. The control apparatus for the rotary electric machine according to claim 1, wherein the allowable value calculation section and the transmitting section include a rotary electric machine control section that controls the rotary electric machine or include a battery control section that controls the battery.

14. The control apparatus for the rotary electric machine according to claim 1, wherein the allowable value calculation section, the transmitting section and the upper limit value setting section include a rotary electric machine control section that controls the rotary electric machine or include a battery control section that controls the battery.

* * * * *